United States Patent
Chang

(10) Patent No.: US 7,926,303 B2
(45) Date of Patent: Apr. 19, 2011

(54) MOLD APPARATUS WITH MULTI-MOLDING CHAMBER

(75) Inventor: Keng-Ming Chang, Taipei Hsien (TW)

(73) Assignee: Hon Hai Precision Industry Co., Ltd., Tu-Cheng, New Taipei (TW)

(*) Notice: Subject to any disclaimer, the term of this patent is extended or adjusted under 35 U.S.C. 154(b) by 300 days.

(21) Appl. No.: 12/182,368

(22) Filed: Jul. 30, 2008

(65) Prior Publication Data

US 2009/0183527 A1 Jul. 23, 2009

(30) Foreign Application Priority Data

Jan. 21, 2008 (CN) .......................... 2008 1 0300170

(51) Int. Cl.
*C03B 11/00* (2006.01)
*B29D 11/00* (2006.01)
*B28B 3/08* (2006.01)

(52) U.S. Cl. ............... 65/305; 65/243; 65/246; 264/2.7; 425/519

(58) Field of Classification Search ............ 65/145, 65/243, 246, 305; 264/2.7; 425/328, 340, 425/344, 346, 357, 518, 519, 520
See application file for complete search history.

(56) References Cited

U.S. PATENT DOCUMENTS

| | | | | |
|---|---|---|---|---|
| 3,535,132 A * | 10/1970 | Lunde | ................... | 501/93 |
| 3,589,880 A * | 6/1971 | Clark | ................... | 65/17.5 |
| 3,632,708 A * | 1/1972 | Mandorf, Jr. et al. | ......... | 264/431 |
| 4,408,980 A * | 10/1983 | Gallizia | ................... | 425/501 |
| 4,477,402 A * | 10/1984 | Ezis | ................... | 264/607 |
| 4,740,147 A * | 4/1988 | Asari et al. | ................... | 425/77 |
| 6,773,252 B2 * | 8/2004 | Furuhata | ................... | 425/186 |
| 7,101,503 B2 * | 9/2006 | Spengler et al. | ................... | 264/250 |
| 2006/0112731 A1 | 6/2006 | Wang | | |

* cited by examiner

*Primary Examiner* — Matthew J Daniels
*Assistant Examiner* — Cynthia Szewczyk
(74) *Attorney, Agent, or Firm* — Andrew C. Cheng

(57) ABSTRACT

A mold apparatus includes a first mold die, a second mold die and an interjacent mold die. The first mold die has a first molding surface. The second mold die has a second molding surface. The interjacent mold die is arranged between the first and second mold dies, and has a third molding surface and an opposite fourth molding surface. The third molding surface and the first molding surface cooperatively form a first molding chamber. The fourth molding surface and the second molding surface cooperatively forms a second molding chamber.

4 Claims, 7 Drawing Sheets

MOLD APPARATUS WITH MULTI-MOLDING CHAMBER

BACKGROUND

1. Technical Field

The present invention relates to mold apparatuses, and particularly, to a mold apparatus for die press molding.

2. Description of Related Art

Die press molding has been widely used for manufacturing articles, such as vitreous lenses.

Referring to FIG. 7, a typical mold apparatus 1 for die press molding is shown. The mold apparatus 1 mainly includes a first mold die 2 and a second mold die 3. The first mold die 2 and the second mold die 3 each have a molding surface to conform to a surface of a workpiece to be molded. In die press molding, first, the first mold die 2 is mounted into a sleeve 4 from the bottom of the sleeve 4, then a preformed vitreous material 6 is placed on the molding surface of the first mold die 2, and finally the second mold die 3 is mounted into the sleeve 4 from the top of the sleeve 4. Generally, the preformed vitreous material 6 is heated on the first mold die 2, and a pressing mechanism 7 is used for pressing the second mold die 3 to move the second mold die 3 towards the first mold die 2. In this way, the preformed vitreous material 6 is molded into a workpiece conforming the molding surfaces of the first and second mold dies 2, 3.

However, the mold apparatus 1 can only mold a workpiece at a time, thus production efficiency is low.

What is needed, therefore, is a mold apparatus, of which the production efficiency is improved.

SUMMARY

A mold apparatus includes a first mold die, a second mold die and an interjacent mold die. The first mold die has a first molding surface. The second mold die has a second molding surface. The interjacent mold die is arranged between the first and second mold dies, and has a third molding surface and an opposite fourth molding surface. The third molding surface and the first molding surface cooperatively form a first molding chamber. The fourth molding surface and the second molding surface cooperatively forms a second molding chamber.

Other advantages and novel features of the present mold apparatus will become more apparent from the following detailed description of embodiment when taken in conjunction with the accompanying drawings.

BRIEF DESCRIPTION OF THE DRAWINGS

Many aspects of the mold apparatus can be better understood with reference to the following drawings. The components in the drawings are not necessarily drawn to scale, the emphasis instead being placed upon clearly illustrating the principles of the present mold apparatus. Moreover, in the drawings, like reference numerals designate corresponding parts throughout the several views.

DETAILED DESCRIPTION OF THE EMBODIMENTS

Embodiment of the present mold apparatus will now be described in detail below and with reference to the drawings.

Figure 1:
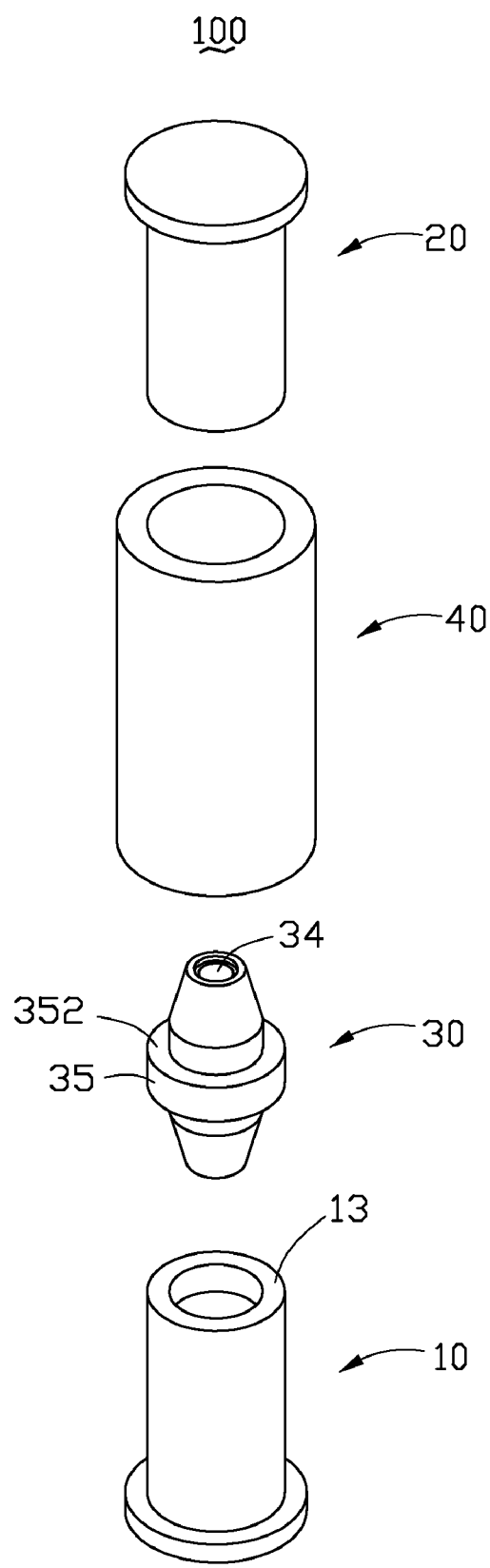
FIG. 1 is a disassembled view of a mold apparatus in accordance with an embodiment of present invention.
Figure 2:
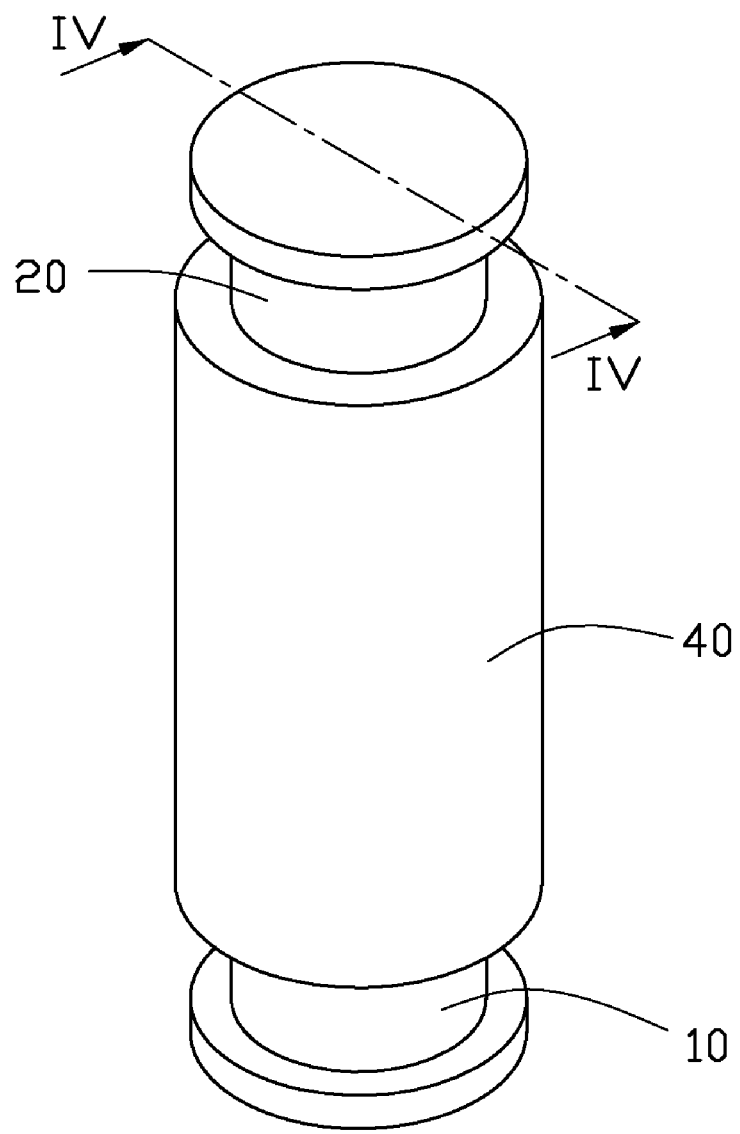
FIG. 2 is an assembled view of the mold apparatus shown in FIG. 1.
Figure 3:
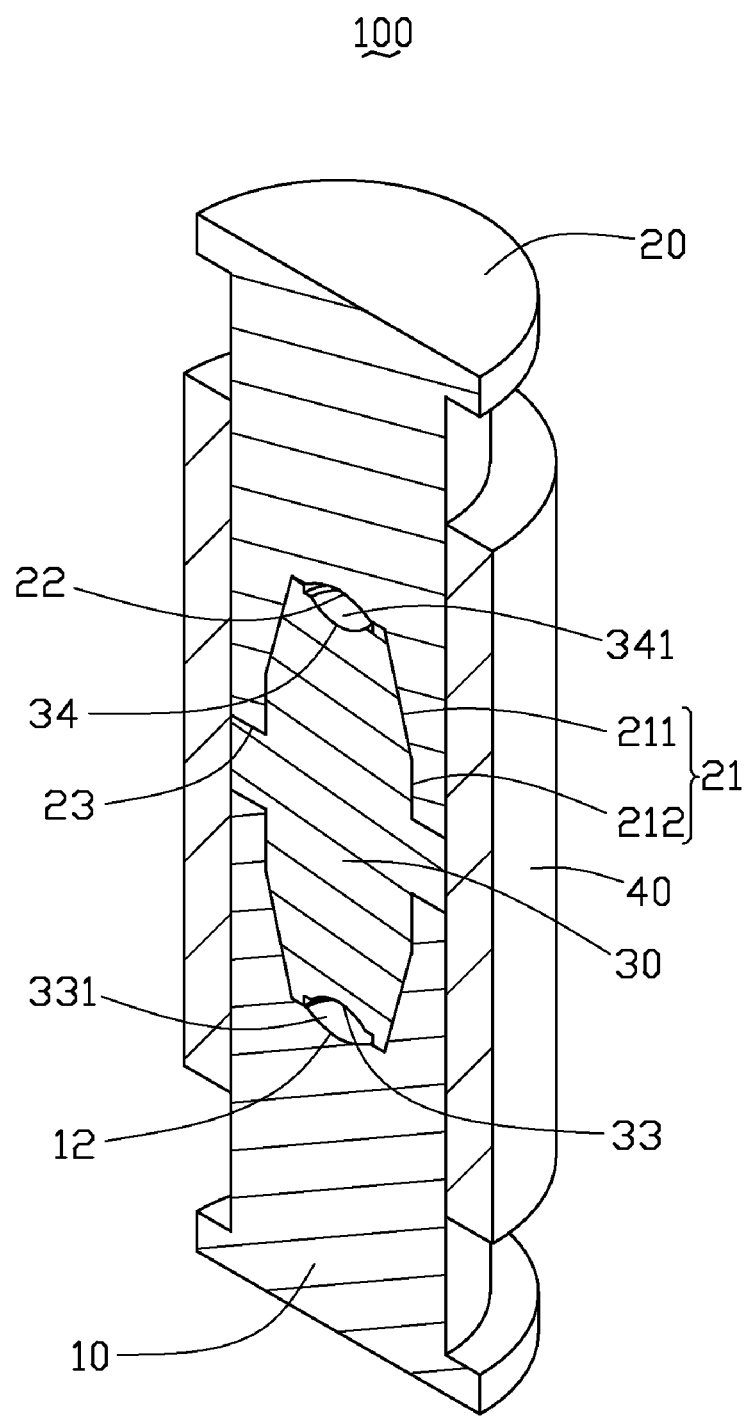
FIG. 3 is a cross-sectional cut away view along the line IV-IV of the mold apparatus shown in FIG. 2.

Referring to FIGS. 1 to 3, a mold apparatus 100 includes a first mold die 10, a second mold die 20, an interjacent mold die 30 and a sleeve 40. The sleeve 40 serves as a housing for receiving the first mold die 10, the second mold die 20, and the interjacent mold die 30.

Figure 4:
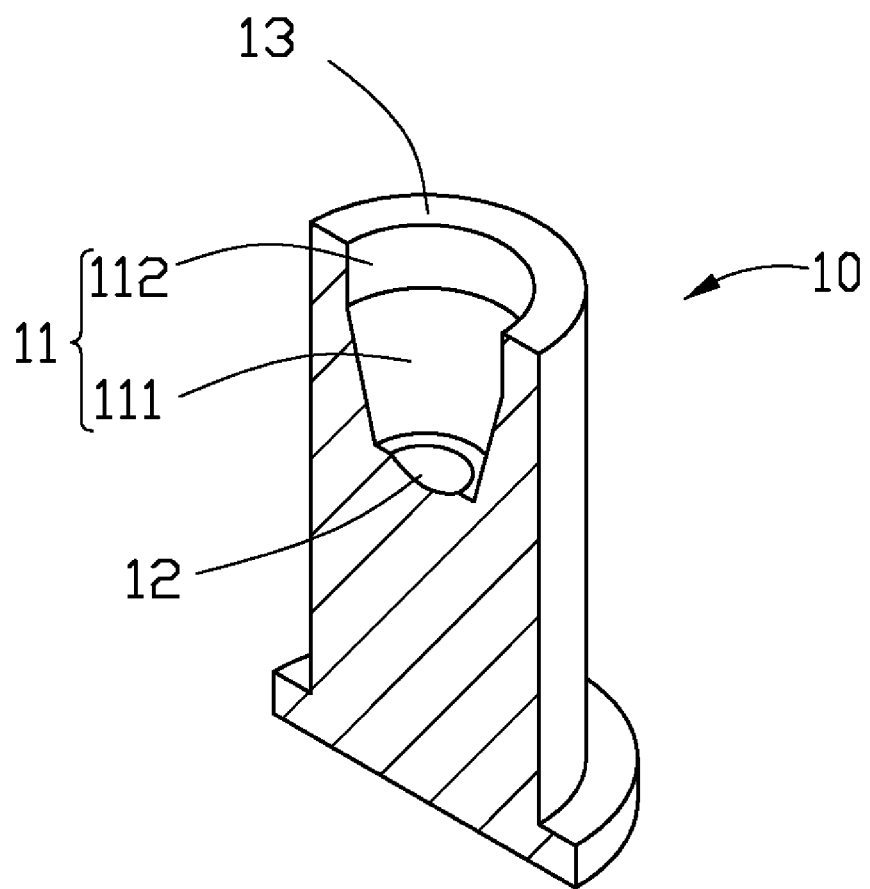
FIG. 4 shows the first mold die in FIG. 3.

Also referring to FIG. 4, the first mold die 10 defines a first cavity 11 therein. A first molding surface 12 is formed on the bottom of the first cavity 11. A first section 111 of the first cavity 11 is adjacent to the first molding surface 12 and is frustoconical shaped. A second section 112 of the first cavity 11 is proximate to the first part 111 and is cylindrical shaped.

The second mold die 20 defines a second cavity 21 therein. A second molding surface 22 is formed on the bottom of the first cavity 21. A first section 211 of the second cavity 21 is adjacent to the second molding surface 22 and is frustoconical shaped. A second section 212 of the second cavity 21 is proximate to the first section 211 and is cylindrical shaped.

Figure 5:
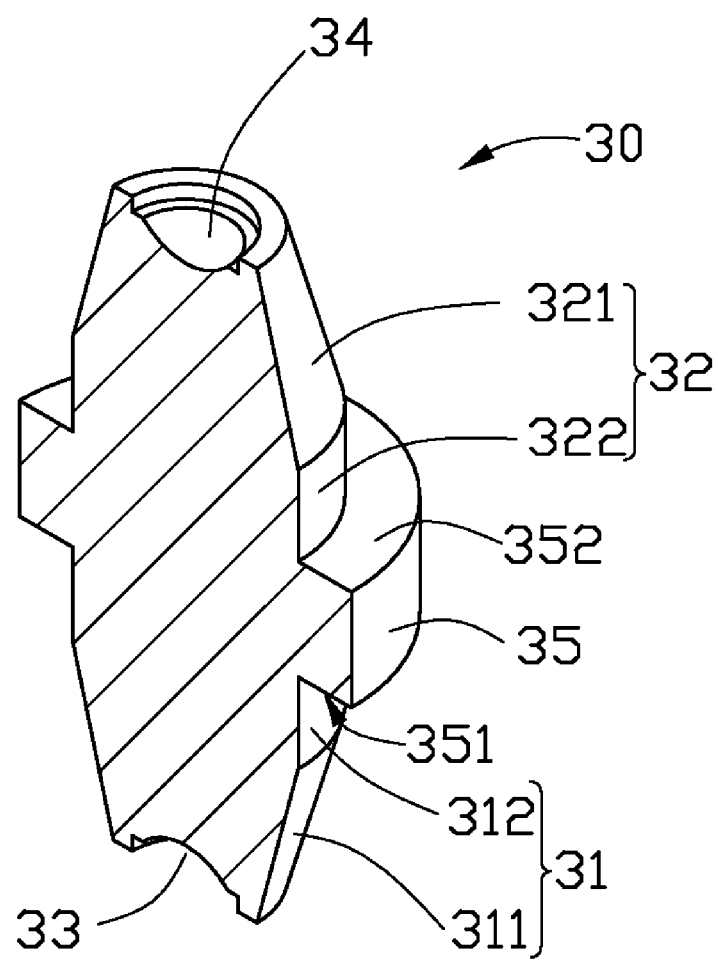
FIG. 5 shows the interjacent mold die in FIG. 3.

Also referring to FIG. 5, the interjacent mold die 30 includes a first end portion 31, a second end portion 32 and a flange 35 arranged between the first and second end portions 31, 32. The first end portion 31 has a frustoconical portion 311, and a cylindrical portion 312. A third molding surface 33 is formed on an end surface of the frustoconical portion 311 of the first end portion 31. The second end portion 32 has a frustoconical portion 321, and a cylindrical portion 322. A fourth molding surface 34 is formed on an end surface of the frustoconical portion 321 of the second end portion 32.

The frustoconical portions 311, 321 of the first and second end portions 31, 32 are to engage with the first sections 111, 211 of the first and second cavities 11, 21, respectively. The cylindrical portions 312, 322 of the first and second end portions 31, 32 are to engage with the second sections 112, 212 of the first and second cavities 11, 21, respectively. The inclined surfaces of the frustoconical portions 311, 321 and the first sections 111, 211 enable the first and second end portions 31, 32 to closely contact with the first and second cavities 11, 21, respectively. The vertical surfaces of the cylindrical portions 312, 322 and second sections 112, 212 enable the first and second end portions 31, 32 to be center-aligned with the first and second cavities 11, 21, respectively. When the first mold die 10, the second mold die 20 and the third mold die 30 are assembled together, an end surface 13 of the first mold die 10 contacts with a bottom surface 351 of the flange 35, and an end surface 23 of the second mold die 20 contacts with a top surface 352 of the flange 35. The first molding surface 12 of the first mold die 10 and the third molding surface 33 of the interjacent mold die 30 cooperatively form a first molding chamber 331. The second molding surface 22 of the second mold die 20 and the fourth molding surface 34 of the interjacent mold die 30 cooperatively form a second molding chamber 341. In present embodiment, the first molding surface 12 and the second molding surface 22 are the same in shape, and the third molding surface 33 and the fourth molding surface 34 are the same in shape, i.e., the first molding chamber 331 and the second molding chamber 341 are the same in shape.

Figure 6:
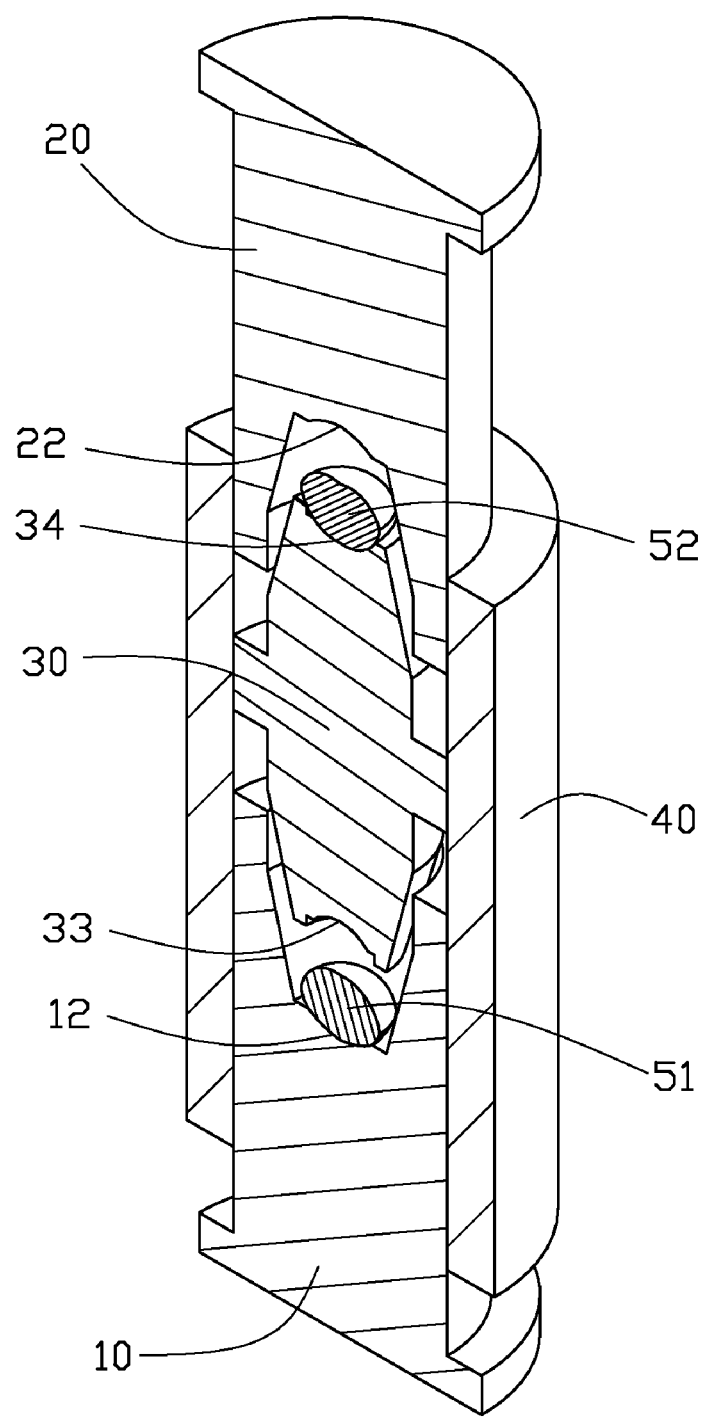
FIG. 6 shows use of the mold apparatus in FIG. 3.
Figure 7:
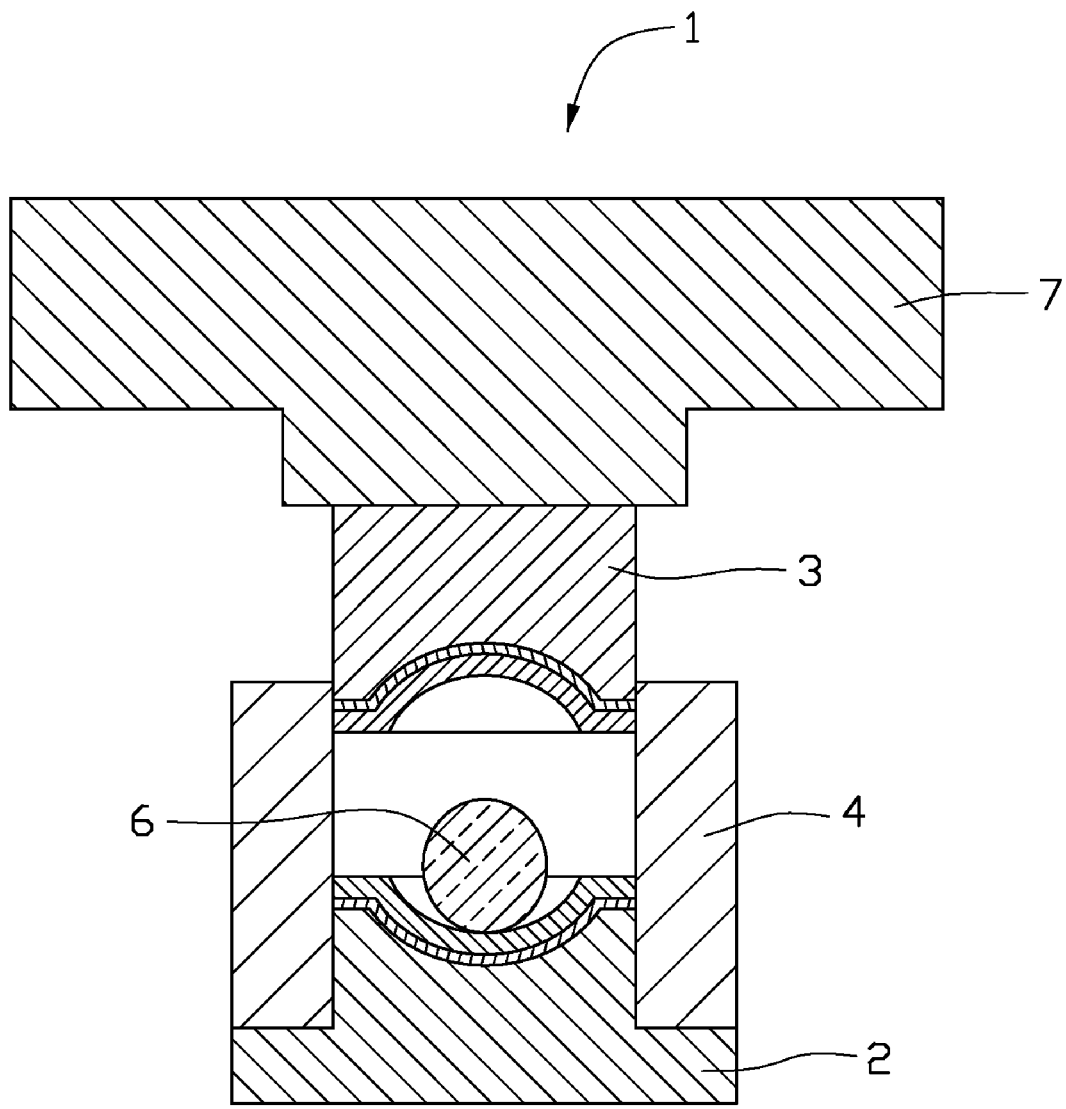
FIG. 7 is a cross-sectional cut away view of a conventional mold apparatus.

In use, referring to FIG. 6, firstly, mount the first mold die 10 into the sleeve 40 from the bottom of the sleeve 40. Secondly, place a first preformed material 51 on the first molding surface 12 of the first mold die 10, from the top of the sleeve 40. Thirdly, mount the interjacent mold die 30 into the sleeve 40. Fourthly, place a second preformed material 52 on the fourth molding surface 34 of the interjacent mold die 30. Fifthly, mount the second mold die 20 into the sleeve 40 from the top of the sleeve 40. The first and second mold dies 10, 20 are in contact with the top surface 352 and the bottom surface 351 of the flange 35, and the sleeve 40 is in contact peripheral surfaces of the first mold die 10, the second mold die 20 and the flange 35 of the interjacent mold die 30. Lastly, apply an pressure on the second mold die 20 to move the second mold die 20 and the interjacent mold die 30, thereby pressing the first and second preformed materials 51, 52 into a first and a second workpieces (not shown) conforming to the first and second molding chamber 331, 341.

Due to the interjacent mold die 30, the mold apparatus 100 can mold two workpieces at a time, thus a production efficiency is improved.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A mold apparatus, comprising:
  a first mold die defining a first cavity therein, and a first molding surface formed at a bottom of the first cavity;
  a second mold die defining a second cavity therein, and a second molding surface formed at a bottom of the second cavity;
  an interjacent mold die arranged between the first and second mold dies with opposite end portions of the interjacent mold die received in the respective the first and second cavities, the interjacent mold die having a flange formed at a middle portion thereof, the first and second mold dies in contact with opposite surfaces of the flange, the interjacent mold die having a third molding surface and an opposite fourth molding surface, the third molding surface and the first molding surface cooperatively forming a first molding chamber, the fourth molding surface and the second molding surface cooperatively forming a second molding chamber; and
  a sleeve receiving the first mold die, the second mold die and the interjacent mold die therein and in contact with a peripheral surface of each of the first mold die, the second mold die and the flange of the interjacent mold die.

2. The mold apparatus of claim 1, wherein each of the first and second cavities has a frustoconical section and a cylindrical section proximate to the frustoconical section, each of the frustoconical sections has a first inclined surface, and each of the cylindrical sections has a first vertical surface; each of opposite end portions of the interjacent mold die has a frustoconical portion, and a cylindrical portion proximate to the frustoconical portion, each of the frustoconical portions has a second inclined surface and an end surface, each of the cylindrical portions has a second vertical surface, the second inclined surfaces in contact with the respective first inclined surfaces, the second vertical surfaces in contact with the respective first vertical surfaces, the third and fourth molding surfaces being formed on the respective end surfaces.

3. A mold apparatus comprising:
  a plurality of separate mold dies each defining a first cavity therein, and a first molding surface formed at a bottom of the first cavity;
  a unitary interjacent mold die having a plurality of second molding surfaces, opposite end portions of the unitary interjacent mold die received in the respective first cavities, the mold dies attached to the unitary interjacent mold die with the first molding surfaces thereof facing toward the respective second molding surfaces of the unitary interjacent mold die, thereby forming a plurality of separated molding chambers between the first and second molding surfaces; wherein each of the first cavities has a frustoconical section and a cylindrical section proximate to the frustoconical section, each of the frustoconical sections has a first inclined surface, and each of the cylindrical sections has a first vertical surface; each of opposite end portions of the unitary interjacent mold die has a frustoconical portion, and a cylindrical portion proximate to the frustoconical portion, each of the frustoconical portions has a second inclined surface and an end surface, each of the cylindrical portions has a second vertical surface, the second inclined surfaces in contact with the respective first inclined surfaces, the second vertical surfaces in contact with the respective first vertical surfaces, the second molding surfaces being formed on the respective end surfaces; and
  a housing receiving the separate mold dies and the unitary interjacent mold die therein and in contact with a peripheral surface of each of the separate mold dies and the unitary interjacent mold die.

4. A mold apparatus comprising:
  a plurality of separate mold dies each defining a first cavity therein, and a first molding surface formed at a bottom of the first cavity;
  a unitary interjacent mold die having a plurality of second molding surfaces, opposite end portions of the unitary interjacent mold die received in the respective first cavities, the mold dies attached to the unitary interjacent mold die with the first molding surfaces thereof facing toward the respective second molding surfaces of the unitary interjacent mold die, thereby forming a plurality of separated molding chambers between the first and second molding surfaces; wherein the unitary interjacent mold die has a flange formed thereon, the flange spaces apart the opposite end portions of the unitary interjacent mold, the separate mold dies are in contact with opposite surfaces of the flange; and
  a housing receiving the separate mold dies and the unitary interjacent mold die therein and in contact with a peripheral surface of each of the separate mold dies and a peripheral surface of the flange of the unitary interjacent mold die;
  wherein each of the first cavities has a frustoconical section and a cylindrical section proximate to the frustoconical section, each of the frustoconical sections has a first inclined surface, and each of the cylindrical sections has a first vertical surface; each of opposite end portions of the unitary interjacent mold die has a frustoconical portion, and a cylindrical portion proximate to the frustoconical portion, each of the frustoconical portions has a second inclined surface and an end surface, each of the cylindrical portions has a second vertical surface, the second inclined surfaces in contact with the respective first inclined surfaces, the second vertical surfaces in contact with the respective first vertical surfaces, the second molding surfaces being formed on the respective end surfaces.

* * * * *